Patented Aug. 25, 1925.

1,550,792

UNITED STATES PATENT OFFICE.

WILLIAM J. EDMONDS, OF TERRE HAUTE, INDIANA, ASSIGNOR TO COMMERCIAL SOLVENTS CORPORATION, OF TERRE HAUTE, INDIANA, A CORPORATION OF MARYLAND.

PRODUCTION OF DIACETONE ALCOHOL.

No Drawing.     Application filed April 10, 1925. Serial No. 22,201.

*To all whom it may concern:*

Be it known that I, WILLIAM J. EDMONDS, a citizen of the United States, residing at 659 Swan Street, Terra Haute, in the county of Vigo and State of Indiana, have invented certain new and useful Improvements in the Production of Diacetone Alcohol, of which the following is a specification.

My invention relates to the production of diacetone alcohol by the catalytic polymerization of acetone, and pertains more especially to an improved process for the manufacture of diacetone alcohol by means of the catalytic action of finely divided alkaline earth hydroxides on acetone.

In 1900, Karl Koelichen (see Zeitschrifte für Physicalische Chemie, volume 33, pages 129–177) studied the catalytic polymerization of acetone to diacetone alcohol. He developed the fact that the true catalyst involved was the hydroxyl ion, and that the precise character of the basic radicle employed was unimportant from the viewpoint of the chemical reaction—i. e.—the hydroxides of alkalis, alkaline earths, or ammonia all function as catalysts of the reaction. Koelichen also developed the fact that the diacetone alcohol reaction reaches equilibrium with the formation of about 13–14% of diacetone alcohol.

Following the work of Koelichen, Doerflinger (U. S. Patent 1,066,474) devised a process for the catalytic polymerization of acetone by means of an alkaline catalyst such as sodium hydroxide in the presence of an inert organic liquid. Hoffman (U. S. Patent 1,082,424) designed a continuous process in which granular calcium hydroxide is employed as a catalyst and the acetone is separated from the formed diacetone alcohol and returned to the catalytic chambers, whereby the equilibrium between acetone and diacetone alcohol is destroyed and all of the acetone is eventually converted to diacetone alcohol.

As the result of my experimental work I have discovered a new process whereby diacetone alcohol may be prepared in pure form at a great reduction in expense and in larger yields than have hitherto been obtained, as will presently be related.

I have discovered that the alkali hydroxides are inherently unsuitable as catalysts in this reaction for the reason that they cause a further polymerization of diacetone alcohol and a resinification of acetone, which products discolor the diacetone alcohol and reduce the yield obtained.

I have discovered that finely divided alkaline earth hydroxides are best suited as catalysts for the polymerization of acetone to diacetone alcohol and that higher yields of diacetone alcohol are obtainable from this type of catalysts than are secured from alkali hydroxides or granular masses of alkaline earth hydroxides.

When granular masses of an alkaline earth hydroxide, for example, calcium hydroxide, are employed as catalysts, great practical difficulty is experienced in securing tough, non-pulverent masses of catalyst, and if such masses are obtained the efficiency of the catalyst is greatly reduced since only the layer of catalyst on the outside of the mass or granule has any appreciable catalytic effect. It is true that the catalyst mass is penetrated by the acetone, but it is also true that the acetone which penetrates the mass is retained therein and does not leave the interior of the mass or granule, except by slow diffusion. For this reason, the acetone initially penetrating or "wetting" a mass or granule is quickly partially converted to diacetone alcohol and the reaction equilibrium is established. The retention, within the mass, of this equilibrium mixture, substantially prevents further catalytic action in the interior of the mass.

Furthermore, the small catalyst surface exposed in an ordinary reaction necessarily makes the catalytic effect a slow one and liquid acetone must be passed through the mass very slowly, or alternatively, over a great amount of catalyst, to attain reaction equilibrium.

When acetone is kept in ordinary contact in liquid phase with an alkaline earth hydroxide in either granular or powdered form, the polymerization of acetone to diacetone alcohol gradually occurs and ceases when the equilibrium point is reached—i. e.—when there is present about 13–14% of diacetone alcohol. Granular masses of calcium hydoxide (hydrated lime) are even less efficient catalysts than finely divided calcium hydroxide on account of the smaller exposed surface. In the case of both powdered and granular alkaline earth hydroxides, the catalytic effect seems to be rapidly reduced by continued use and this, I believe, is due to a catalyst "poisoning" caused by the formation of a "film" of adherent diacetone alcohol or higher polymers of acetone, over each particle of catalyst.

I have discovered that when acetone is rapidly agitated with finely divided calcium hydroxide (hydrated lime powder) the diacetone alcohol-acetone equilibrium is reached very much more quickly than in the case of simple contact, and the catalyst is capable of producing a very much larger quantity of diacetone alcohol before its activity is diminished. These two advantages are due to the finely divided state of the catalyst which provides the greatest possible active surface, and to the violent agitation which not only increases catalytic contact but also seems to prevent a film of diacetone alcohol or other polymers of acetone from surrounding the catalyst and diminishing its activity.

The improvement of result attained by employing a finely divided alkaline earth hydroxide such as calcium hydroxide in agitated contact with acetone, over the result obtained by simple contact of acetone with a granular or powdered catalyst is profound. The yield of diacetone alcohol per pound of catalyst per twenty four hour period of operation varies from 1.28 pounds by simple contact, to 7.0 pounds by violent agitation with a finely divided catalyst.

In the practice of my invention I may proceed as follows:—

Dry acetone, at room temperature, is placed in a suitable vessel and one tenth its weight of finely divided calcium hydroxide is added. The mixture is violently agitated for about one to two hours, at the end of which time the reaction has reached equilibrium and about 13–14% of diacetone alcohol is present in the mixture. Agitation is then ceased and after the lime has settled, the clear liquid is drawn off through a filter press to a still where the acetone is removed by distillation. Since there are no impurities present, the residual liquid is substantially pure diacetone alcohol. The recovered acetone is returned to the mixing vessel and agitated with the catalyst for the production of more diacetone alcohol.

It is very necessary that a filter press or similar device be interposed between the mixing vessel and the still, as any traces of suspended catalyst in the liquid in the still would cause a decomposition of the diacetone alcohol to acetone, when heated.

Now, having fully described my invention, I claim the following as new and novel:

1. A catalytic process for the production of diacetone alcohol which consists in agitating acetone in the presence of a finely divided alkaline earth hydroxide.

2. A catalytic process for the production of diacetone alcohol which consists in agitating acetone in the presence of a finely divided alkaline earth hydroxide, separating the reaction liquid from the alkaline earth hydroxide, and removing unreacted acetone by distillation.

3. A catalytic process for the production of diacetone alcohol which consists in agitating acetone in the presence of a finely divided alkaline earth hydroxide until the diacetone alcohol-acetone equilibrium is attained, separating the reaction liquid from the alkaline earth hydroxide, and removing the unreacted acetone by distillation.

4. A catalytic process for the production of diacetone alcohol which consists in agitating acetone in the presence of a finely divided alkaline earth hydroxide, allowing the hydroxide catalyst to settle out of suspension, decanting the clear reaction liquid, and removing the unreacted acetone by distillation.

5. A catalytic process for the production of diacetone alcohol which consists in agitating acetone in the presence of a finely divided alkaline earth hydroxide until the diacetone alcohol-acetone equilibrium is attained, allowing the hydroxide catalyst to settle out of suspension, decanting the clear reaction liquid, and removing the unreacted acetone by distillation.

6. A catalytic process for the production of diacetone alcohol which consists in agitating acetone in the presence of finely divided calcium hydroxide, separating the reaction liquid from the calcium hydroxide, and removing the unreacted acetone by distillation.

7. A catalytic process for the production of diacetone alcohol which consists in agitating acetone in the presence of finely divided calcium hydroxide.

8. A catalytic process for the production of diacetone alcohol which consists in agitating acetone in the presence of finely divided calcium hydroxide until the diacetone alcohol-acetone equilibrium is attained, separating the reaction liquid from the calcium hydroxide, and removing the unreacted acetone by distillation.

9. A catalytic process for the production of diacetone alcohol which consists in agitating acetone in the presence of finely divided calcium hydroxide, allowing the hydroxide catalyst to settle out of suspension, decanting the clear reaction liquid, and removing the unreacted acetone by distillation.

10. A catalytic process for the production of diacetone alcohol which consits in agitating acetone in the presence of finely divided calcium hydroxide until the diacetone alcohol-acetone equilibrium is attained, allowing the hydroxide catalyst to settle out of suspension, decanting the clear reaction liquid, and removing the unreacted acetone by distillation.

In testimony whereof I affix my signature.

WILLIAM J. EDMONDS.